(12) United States Patent
Sakiyama

(10) Patent No.: US 9,925,833 B2
(45) Date of Patent: Mar. 27, 2018

(54) AIRCRAFT PNEUMATIC TIRE

(71) Applicant: BRIDGESTONE CORPORATION, Chuo-ku, Tokyo (JP)

(72) Inventor: Tomotaka Sakiyama, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 171 days.

(21) Appl. No.: 14/771,808

(22) PCT Filed: Mar. 12, 2014

(86) PCT No.: PCT/JP2014/056561
§ 371 (c)(1),
(2) Date: Sep. 1, 2015

(87) PCT Pub. No.: WO2014/148340
PCT Pub. Date: Sep. 25, 2014

(65) Prior Publication Data
US 2016/0009139 A1    Jan. 14, 2016

(30) Foreign Application Priority Data
Mar. 18, 2013   (JP) .................................. 2013-055343

(51) Int. Cl.
*B60C 9/20* (2006.01)
*B60C 9/00* (2006.01)
(Continued)

(52) U.S. Cl.
CPC .......... *B60C 9/0057* (2013.01); *B60C 9/2009* (2013.01); *B60C 11/04* (2013.01);
(Continued)

(58) Field of Classification Search
CPC . B60C 9/0057; B60C 9/1821; B60C 2200/02; B60C 2009/2032; B60C 2009/2228; B60C 2009/229
See application file for complete search history.

(56) References Cited

U.S. PATENT DOCUMENTS 3,570,574 A * 3/1971 Marker ................. B60C 9/0042
152/527
3,990,493 A * 11/1976 Caretta ..................... B60C 9/18
152/526

(Continued)

FOREIGN PATENT DOCUMENTS

JP          07069005 A  *  3/1995
JP       2002-087018 A     3/2002
WO       03/061991 A1      7/2003

OTHER PUBLICATIONS

Machine Translation: JP-07069005-A; Shoyama, Yoshinobu; (Year: 2017).*

*Primary Examiner* — Michael H. Wilson
*Assistant Examiner* — Kendra Ly
(74) *Attorney, Agent, or Firm* — Solaris Intellectual Property Group PLLC

(57) ABSTRACT

An object of the invention is to increase the room for elongation of a tread protection layer, while securing durability.

An aircraft pneumatic tire 10 includes: a tread protection layer (12) that is provided at a lower layer of a tread section (22), and that includes plural cords (24) that arrayed in a tire width direction and are each disposed along a wave shaped imaginary line extending along a tire circumferential direction with the tire width direction as the amplitude direction; and cord discontinuity portions (14) where locations of close proximity of the cords (24) to each other are partially omitted in the tread protection layer (12).

4 Claims, 2 Drawing Sheets

(51) Int. Cl.
 *B60C 11/04* (2006.01)
 *B60C 9/22* (2006.01)
(52) U.S. Cl.
 CPC ............... *B60C 2009/2032* (2013.01); *B60C 2009/229* (2013.01); *B60C 2200/02* (2013.01)

(56) References Cited

U.S. PATENT DOCUMENTS

| | | | | |
|---|---|---|---|---|
| 5,783,003 | A | * | 7/1998 | Lescoffit ............... B60C 9/1821 152/451 |
| 6,843,294 | B2 | * | 1/2005 | Togo ....................... B60C 9/20 152/526 |
| 2002/0056497 | A1 | | 5/2002 | Togo |
| 2007/0137744 | A1 | * | 6/2007 | Ueyoko ............. B60C 11/0306 152/209.1 |
| 2013/0186543 | A1 | * | 7/2013 | Viller ................... B60C 9/1821 152/556 |

* cited by examiner

AIRCRAFT PNEUMATIC TIRE

TECHNICAL FIELD

The present invention relates to an aircraft pneumatic tire.

BACKGROUND ART

Resistance to foreign objects, namely cut resistance, is an example of performance demanded of aircraft pneumatic tires. In order to secure such cut resistance, a structure provided with a tread protection layer in a lower layer of the tread is disclosed in International Publication (WO) No. 2003-061991.

SUMMARY OF INVENTION

Technical Problem

The above tread protection layer is configured with plural cords extending in the tire circumferential direction that are arrayed in the tire width direction and are coated in rubber. The circumferential length of the tread increases as the diameter of the tire lengthens when internal pressure is charged in the tire, and the cords of the tread protection layer are stretched. In order to suppress any increase in tension in the cords when this occurs, each of the cords is formed in a wave shape with an amplitude in the tire width direction, thereby securing room for elongation in advance.

However, there is a need to make the amplitude in the tire width direction larger in order to secure more room for elongation of the cords in aircraft pneumatic tires that have a large increase in diametric length during charging of the internal pressure, with a concern that adjacent cords will interfere with each other.

In consideration of the above circumstances, an object of the present invention is to increase the room for elongation of a tread protection layer, while securing durability.

Solution to Problem

An aircraft pneumatic tire according to a first aspect of the present invention includes a tread protection layer that is provided at a lower layer of a tread section, and that includes a plurality of cords that are arrayed in a tire width direction and are each disposed along a wave shaped imaginary line extending along a tire circumferential direction with the tire width direction as the amplitude direction, wherein the cords in the tread protection layer include plural cord discontinuity portions along the tire circumferential direction.

In this aircraft pneumatic tire there are cord discontinuity portions provided in the cords of the tread protection layer, and so interference is not liable to occur between adjacent cords even if the amplitude of the cord is large in the tire width direction. This thereby enables the amplitude of the cord to be increased, and the room for elongation of the tread protection layer to be increased. Moreover, suppressing interference between adjacent cords suppresses separation from occurring and enables durability to be secured. This thereby enables room for elongation of the tread protection layer to be increased, while securing the durability.

A second aspect of the present invention is the aircraft pneumatic tire according to the first aspect, wherein the cords are formed in a sine wave shape as viewed in tread plan view, and the cord discontinuity portions include positions corresponding to inflection points of the sine waves.

In this aircraft pneumatic tire, the cord discontinuity portions include the positions corresponding to inflection points of the sine waves, and so the adjacent cords are not liable to interfere with each other even when the amplitude of the cords is made large in the tire width direction. The sine wave shaped cords are accordingly suppressed from interfering with each other, enabling durability to be secured.

A third aspect of the present invention is the aircraft pneumatic tire according to the first aspect or the second aspect, wherein: the tread section is partitioned by plural circumferential direction grooves extending along the tire circumferential direction into a wide-width rib positioned at a tire width direction central portion, and into narrow-width ribs positioned at the tire width direction outer sides of the wide-width rib; and a tire circumferential direction interval between one of the cord discontinuity portions and another of the cord discontinuity portions is narrower in a region corresponding to the wide-width rib than in the regions corresponding to the narrow-width ribs.

In this aircraft pneumatic tire, the wide-width rib of the tread section is positioned at a tire width direction central portion where the diametrical length increase is largest during charging internal pressure. The interval in the tire circumferential direction between one of the cord discontinuity portions and another of the cord discontinuity portions is set narrower in a region corresponding to the wide-width rib than in the regions corresponding to the narrow-width ribs. The room for elongation in the wide-width rib in the tread protection layer is thereby larger than the room for elongation in the narrow-width ribs. This thereby enables the room for elongation of the tread protection layer to be made appropriate to the differences in diametrical length increase of the respective ribs.

Advantageous Effects of Invention

As explained above, the aircraft pneumatic tire according to the present invention obtains the excellent advantageous effect of enabling the room for elongation of the tread protection layer to be increased, while securing durability.

DESCRIPTION OF EMBODIMENTS

Figure 1:
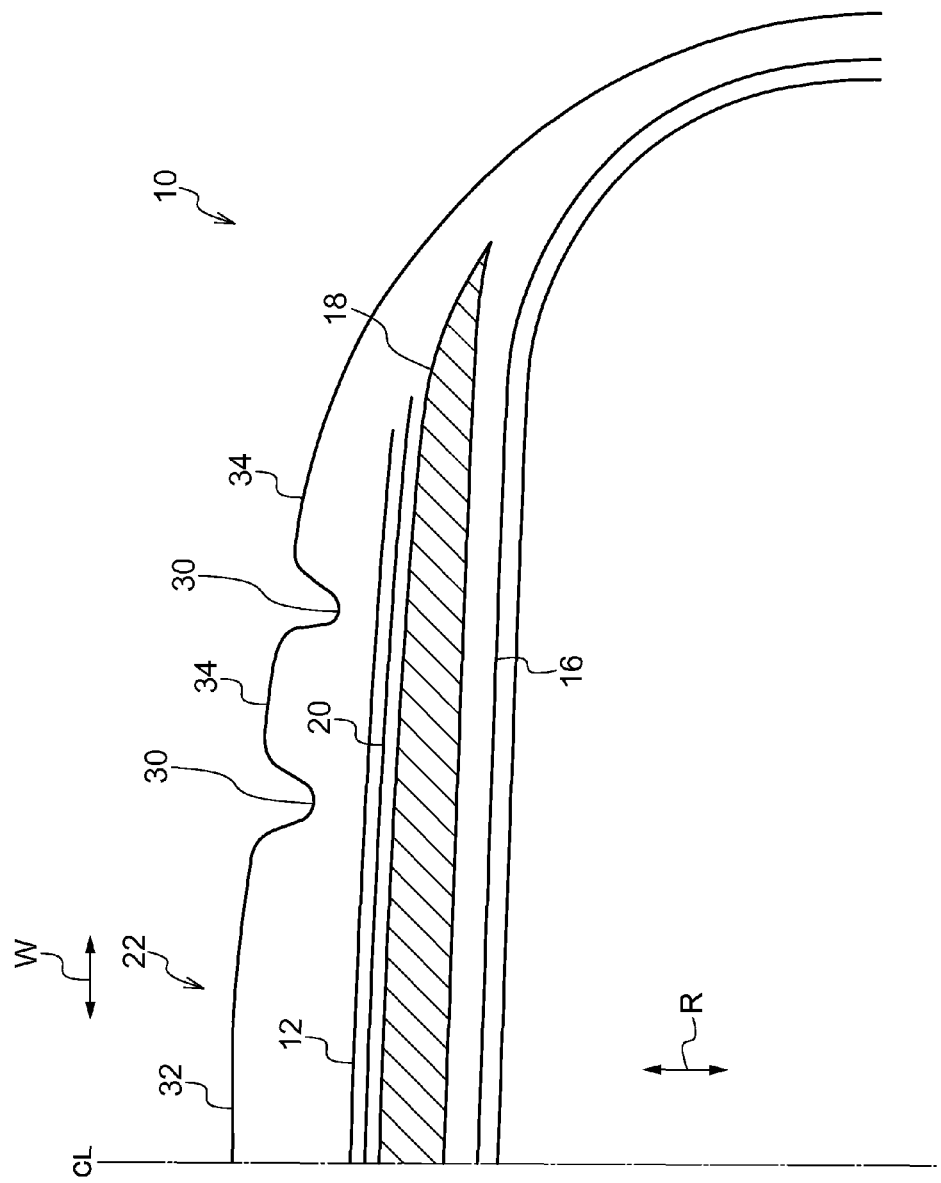
FIG. 1 is a cross-section illustrating an aircraft pneumatic tire in a section taken along the tire axial direction.

Explanation follows regarding embodiments for implementing the present invention, with reference to the drawings. In the drawings, the arrow C direction indicates the tire circumferential direction, the arrow R direction indicates the tire radial direction, and the arrow W direction indicates the tire width direction. The tire radial direction means a direction orthogonal to the tire rotation axis (not illustrated in the drawings). The tire width direction means a direction parallel to the tire rotation axis. References to the tire width direction may be interchanged with the tire axial direction.

Figure 2:
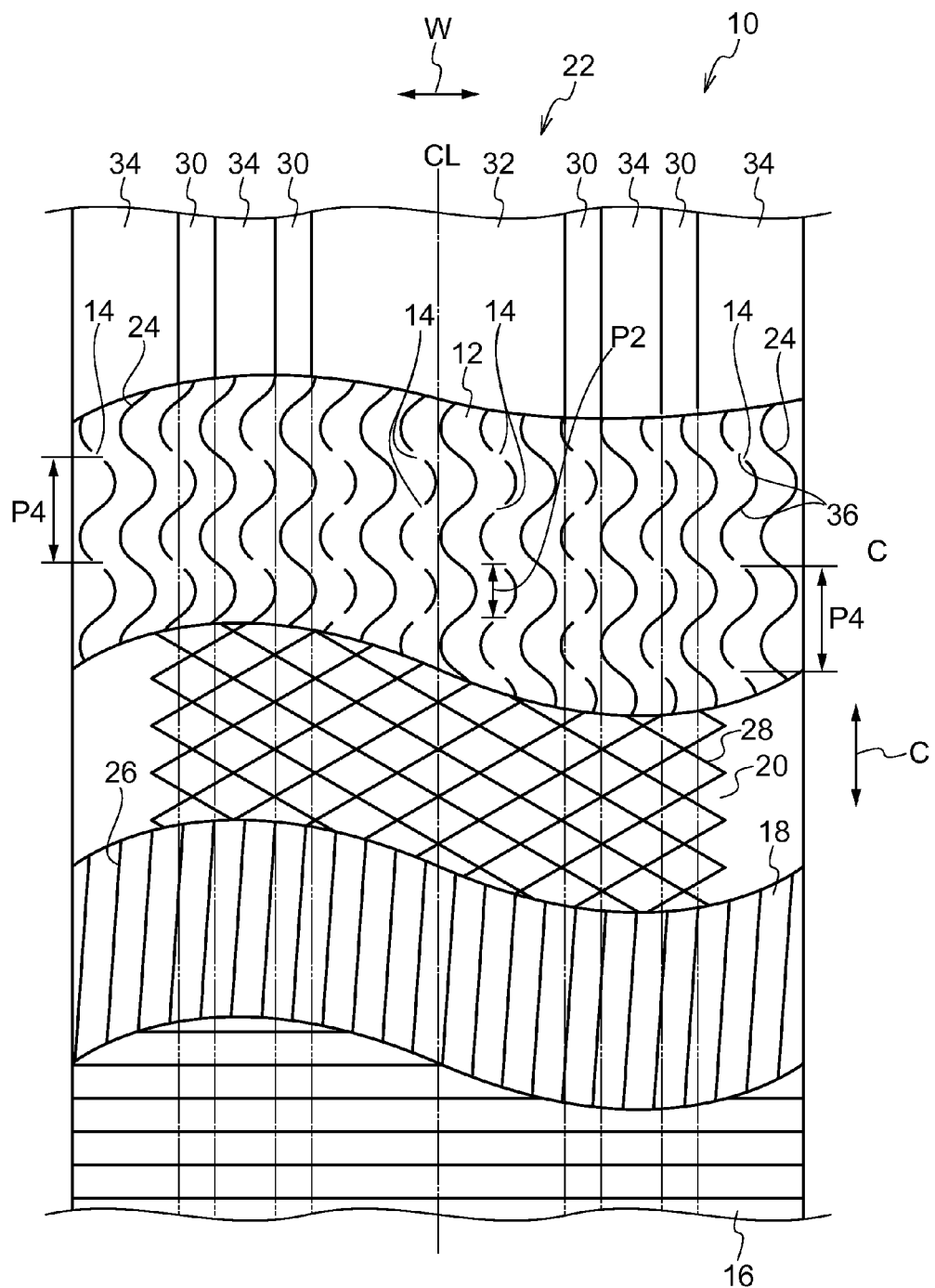
FIG. 2 is a diagram schematically illustrating a superimposed state of a carcass ply, a belt layer, and a tread protection layer, in a partial cut-away opened out diagram as viewed from the tire radial direction outside.

In FIG. 1 and FIG. 2, an aircraft pneumatic tire 10 according to the present exemplary embodiment is, for example, a radial tire, and includes a tread protection layer 12. The aircraft pneumatic tire 10 includes a carcass ply 16, a belt layer 18, and a reinforcement layer 20.

The belt layer 18 is provided at the tire radial direction outside of the carcass ply 16, and is configured by winding a rubber covered cord 26 along a tire circumferential direction in a spiral shape. Organic fiber, steel, or the like is employed as the material of the cord 26. The belt layer 18 is not limited to being a single layer, and may be configured by plural layers.

The reinforcement layer 20 is provided at the tire radial direction outside of the belt layer 18, and is configured by employing plural strands of cord 28 that are disposed at an angle to the tire circumferential direction. The cords 28 are configured so as to reverse at the edges of the reinforcement layer 20 so as to intersect with each other, however, there is no limitation thereto, and a configuration may be adopted in which the cords 28 do not intersect with each other. Organic fiber or the like is employed as the material of the cord 28.

In FIG. 2, the tread protection layer 12 is provided at a lower layer of a tread section 22, and includes plural cords 24 that are arrayed in the tire width direction and are each disposed along a wave shaped imaginary line extending along the tire circumferential direction, with the tire width direction as the amplitude direction. The tread protection layer 12 is positioned at the tire radial direction outside of the reinforcement layer 20. Organic fiber or the like is employed in the material of the cord 24. The cords 24 are formed, for example, in a sine wave shape in a plan view of the tread.

The cord 24 in the tread protection layer 12 includes cord discontinuity portions 14 in the tire circumferential direction. The cord discontinuity portions 14 are locations where the cords 24 in close proximity to each other are partially omitted in the tread protection layer 12, and are, for example, provided in every other cord 24. The cord discontinuity portions 14 include positions corresponding to inflection points 36 of sine waves. Specifically, the cord discontinuity portions 14 include the inflection points 36, and are provided at both sides of the inflection points 36 in the portions between maximum amplitude points and minimum amplitude points. The inflection points 36 are points where the center of circular arc portions configuring the wave shape switch from being positioned in the tire width direction on one side of the cord to being positioned on the other side of the cord. As the amplitude of the cord 24 increases, the cords 24 are closest to each other in the vicinity of the inflection points 36. Namely, the vicinity of the inflection points 36 are locations of close proximity between the cords 24. The cords 24 are omitted at these locations of close proximity due to being susceptible to mutual interference. In other words, the cords 24 are partially interrupted and replaced with rubber at the cord discontinuity portions 14.

The tread section 22 is partitioned by plural circumferential direction grooves 30 extending along the tire circumferential direction, into a wide-width rib 32 positioned at a tire width direction central portion and narrow-width ribs 34 positioned at the tire width direction outer sides of the wide-width rib 32. A tire circumferential direction interval between one cord discontinuity portion 14 and another cord discontinuity portion 14 is narrower in a region corresponding to the wide-width rib 32 than in the regions corresponding to the narrow-width ribs 34. This interval is the tire circumferential direction pitch of the cord discontinuity portions 14. Measurement of this interval may be taken with reference to the center of the cord discontinuity portions 14, or may be taken with reference to end portions of the cords 24 interrupted at the cord discontinuity portions 14. P2<P4, wherein P2 is the interval between the cord discontinuity portions 14 at the wide-width rib 32, and P4 is the interval between the cord discontinuity portions 14 at the narrow-width ribs 34. In the example illustrated in FIG. 2, P2≈P4× 0.5. The interval P2 and the interval P4 are not limited to being constant, and may vary appropriately in the tire circumferential direction.

Operation

Explanation follows regarding operation of the present exemplary embodiment configured as described above. In FIG. 1 and FIG. 2, in the aircraft pneumatic tire 10 according to the present exemplary embodiment, the cord discontinuity portions 14 are provided in the cords 24 of the tread protection layer 12, and so adjacent cords 24 are not liable to interfere with each other, even when there is a large amplitude of the cords 24 in the tire width direction. This thereby enables the amplitude of the cords 24 to be increased, enabling the room for elongation of the tread protection layer 12 to be increased. The occurrence of separation is suppressed due to suppressing the adjacent cords 24 from interfering with each other, enabling durability to be secured. This thereby enables the room for elongation of the tread protection layer 12 to be increased, while securing durability.

In particular, in the cords 24, the cord discontinuity portions 14 are present at the positions corresponding to the inflection points 36 of a sine wave, and so adjacent cords 24 are not liable to interfere with each other even when the amplitude of the cords 24 in the tire width direction is large. This thereby enables the sine wave shaped cords 24 to be suppressed from interfering with each other, enabling durability to be secured.

Moreover, in the present exemplary embodiment, the wide-width rib 32 of the tread section 22 is positioned at a tire width direction central portion where the diametrical length increase is largest during charging internal pressure. The interval in the tire circumferential direction between one cord discontinuity portion 14 and another cord discontinuity portion 14 is set narrower in a region corresponding to the wide-width rib 32 than in the regions corresponding to the narrow-width ribs 34 (P2<P4). Consequently the room for elongation in the wide-width rib 32 of the tread protection layer 12 is larger than the room for elongation in the narrow-width ribs 34. This thereby enables the room for elongation of the tread protection layer 12 to be made appropriate to the differences in diametrical length increase of the respective ribs.

Other Exemplary Embodiments

In the above exemplary embodiment, the cord discontinuity portions 14 are provided every other cord 24, however, there is no limitation thereto, and the cord discontinuity portions 14 may be provided in all of the cords 24, or the cord discontinuity portions 14 may be provided randomly.

The shape of the cords 24 is also not limited to being a sine wave, and may be another curved wave shape, may be a triangular wave shape, or may be a rectangular wave shape. The position of the cord discontinuity portions 14 may be appropriately determined according to the shape and the layout of the cords 24. Depending on the shape of the disconnected cord portions 14, the cord discontinuity portions 14 may also be provided at freely selected locations when there is no clear location of nearest close proximity between the cords 24 present. The intervals between the cords 24 in the tire width direction is also not limited to those illustrated in the drawings, and the cords 24 may be even nearer to each other. However, preferably the cords 24 do not touch each other from the perspective of suppressing separation.

Test Examples

A test in which a tire filled to the regulated internal pressure was rotated for 10 minutes at 64 km/h was executed at 60 minute cycles. An index for durability was compiled from the number of times repeated until damage occurred at the protection layer cord contact portions, taking the number of times of Comparative Example as 100. Table 1 illustrates the results of tests performed using 30×8.8R15, 16PR as the representative size.

TABLE 1

| | Conventional Example | Example 1 | Example 2 | Example 3 | Example 4 |
|---|---|---|---|---|---|
| Number of Cord Discontinuity Portions in Wide-Width Rib | — | 8 | 12 | 18 | 24 |
| Durability | 100 | 105 | 107 | 110 | 110 |
| Room For Elongation of Tread Protection Layer | 100 | 101 | 102 | 103 | 104 |

The entire disclosure of Japanese Patent Application 2013-55343 filed on Mar. 18, 2013 is incorporate in the present specification by reference.

All publications, patent applications and technical standards mentioned in the present specification are incorporated by reference in the present specification to the same extent as if the individual publication, patent application, or technical standard was specifically and individually indicated to be incorporated by reference.

EXPLANATION OF THE REFERENCE NUMERALS 10 aircraft pneumatic tire
12 tread protection layer
14 cord discontinuity portion
22 tread section
24 cord
30 circumferential direction groove
32 wide-width rib
34 narrow-width rib
36 inflection point
P2 interval
P4 interval

The invention claimed is:

1. An aircraft pneumatic tire, comprising:
a tread protection layer that is provided at a lower layer of a tread section, and that includes a plurality of cords that are arrayed in a tire width direction and are each disposed along a wave shaped imaginary line extending along a tire circumferential direction with the tire width direction as the amplitude direction, wherein
the cords in the tread protection layer include a plurality of cord discontinuity portions along the tire circumferential direction,
the cord discontinuity portions are provided at every other cord, and
the cords between the every other cord having the cord discontinuity portions are continuous.

2. The aircraft pneumatic tire of claim 1, wherein:
the cords are formed in a sine wave shape as viewed in tread plan view; and
the cord discontinuity portions include positions corresponding to inflection points of the sine waves.

3. The aircraft pneumatic tire of claim 1, wherein:
the tread section is partitioned, by a plurality of circumferential direction grooves extending along the tire circumferential direction, into a wide-width rib positioned at a tire width direction central portion, and into narrow-width ribs positioned at the tire width direction outer sides of the wide-width rib; and
a tire circumferential direction interval between one of the cord discontinuity portions and another of the cord discontinuity portions is narrower in a region corresponding to the wide-width rib than in the regions corresponding to the narrow-width ribs.

4. The aircraft pneumatic tire of claim 2, wherein:
the tread section is partitioned, by a plurality of circumferential direction grooves extending along the tire circumferential direction, into a wide-width rib positioned at a tire width direction central portion, and into narrow-width ribs positioned at the tire width direction outer sides of the wide-width rib; and
a tire circumferential direction interval between one of the cord discontinuity portions and another of the cord discontinuity portions is narrower in a region corresponding to the wide-width rib than in the regions corresponding to the narrow-width ribs.

* * * * *